United States Patent
Kato et al.

(10) Patent No.: US 10,305,140 B2
(45) Date of Patent: May 28, 2019

(54) SULFIDE SOLID ELECTROLYTE MATERIAL, BATTERY, AND METHOD FOR PRODUCING SULFIDE SOLID ELECTROLYTE MATERIAL

(71) Applicants: Yuki Kato, Susono (JP); Takamasa Ohtomo, Susono (JP)

(72) Inventors: Yuki Kato, Susono (JP); Takamasa Ohtomo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 14/710,987

(22) Filed: May 13, 2015

(65) Prior Publication Data
US 2015/0333367 A1 Nov. 19, 2015

(30) Foreign Application Priority Data
May 15, 2014 (JP) .................................. 2014-101314

(51) Int. Cl.
*H01M 10/0562* (2010.01)
*C01B 17/22* (2006.01)
*C01B 25/14* (2006.01)
*H01M 10/052* (2010.01)

(52) U.S. Cl.
CPC ......... *H01M 10/0562* (2013.01); *C01B 17/22* (2013.01); *C01B 25/14* (2013.01); *H01M 10/052* (2013.01); *H01M 2300/0068* (2013.01)

(58) Field of Classification Search
None
See application file for complete search history.

(56) References Cited

U.S. PATENT DOCUMENTS

| | | | | |
|---|---|---|---|---|
| 2007/0160911 A1* | 7/2007 | Senga | .................. | C03C 4/18 |
| | | | | 429/322 |
| 2007/0172739 A1* | 7/2007 | Visco | .................. | H01M 12/08 |
| | | | | 429/322 |
| 2010/0290969 A1* | 11/2010 | Deiseroth | .............. | C01D 15/00 |
| | | | | 423/300 |

(Continued)

FOREIGN PATENT DOCUMENTS

| | | | | | |
|---|---|---|---|---|---|
| JP | 2013-137889 | * | 7/2013 | ........ | H01M 10/0562 |
| JP | 2013-137889 A | | 7/2013 | | |

(Continued)

OTHER PUBLICATIONS

Murayama et al., "Synthesis of New Lithium Ionic Conductor Thio-LISICON-Lithium Silicon Sulfides System," J. Solid State Chem., 168, 140-148 (2002) (Year: 2002).*

(Continued)

*Primary Examiner* — Amanda J Barrow
(74) *Attorney, Agent, or Firm* — Oliff PLC (57) ABSTRACT

An object of the present invention is to provide a sulfide solid electrolyte material having satisfactory ion conductivity. In the present invention, the above object is solved by providing a sulfide solid electrolyte material comprising a Li element, a Si element, a P element, a S element, and an X element (in which X represents at least one of F, Cl, Br and I), the sulfide solid electrolyte material having a crystal phase B having a peak at the position of $2\theta=30.12°\pm1.00°$ measured by X-ray diffractometry using CuKα ray.

9 Claims, 5 Drawing Sheets

(56) References Cited

U.S. PATENT DOCUMENTS

| | | | | |
|---|---|---|---|---|
| 2013/0040208 A1* | 2/2013 | Kanno | ................... | C01B 17/20 |
| | | | | 429/319 |
| 2014/0302382 A1* | 10/2014 | Kambara | ................ | C03C 10/16 |
| | | | | 429/162 |
| 2015/0333368 A1 | 11/2015 | Kato et al. | | |
| 2016/0156064 A1* | 6/2016 | Miyashita | ......... | H01M 10/0525 |
| | | | | 429/323 |
| 2016/0164136 A1* | 6/2016 | Higuchi | ............. | H01M 10/052 |
| | | | | 429/323 |

FOREIGN PATENT DOCUMENTS

| | | | | | |
|---|---|---|---|---|---|
| JP | 2013-201110 A | 10/2013 | | | |
| JP | 2015-220013 A | 12/2015 | | | |
| WO | 2011/118801 A1 | 9/2011 | | | |
| WO | WO 2011/118801 | * | 9/2011 | ........ | H01M 10/0562 |
| WO | WO 2013/069243 | * | 5/2013 | ........ | H01M 10/0562 |

OTHER PUBLICATIONS

Whiteley et al., "Empowering the Lithium Metal Battery through a Silicon-based Superionic Conductor," J. Electrochem. Society, 161 (12), A1812-A1817 (2014), published Aug. 22, 2014 (Year: 2014).*

* cited by examiner

SULFIDE SOLID ELECTROLYTE MATERIAL, BATTERY, AND METHOD FOR PRODUCING SULFIDE SOLID ELECTROLYTE MATERIAL

TECHNICAL FIELD

The present invention relates to a sulfide solid electrolyte material having satisfactory ion conductivity.

BACKGROUND ART

Along with the rapid distribution of information-related equipment and communication equipment such as personal computers, video cameras and mobile telephones in recent years, more emphasis is placed on the development of batteries that are used as power sources of the equipment. Furthermore, development of high output power and high capacity batteries for electric vehicles or hybrid vehicles is in progress in automobile industries and the like as well. Currently, lithium batteries are attracting more attention among a variety of batteries, from the viewpoint of having high energy density.

In lithium batteries that are currently available in the market, since liquid electrolytes containing flammable organic solvents are used, installation of a safety device for suppressing temperature increase at the time of a short circuit, or an apparatus intended for preventing short circuits is needed. In this regard, it is speculated that since a lithium battery obtained by converting a battery to an all solid state battery by replacing the liquid electrolyte with a solid electrolyte layer, does not use a flammable organic solvent in the battery, simplification of safety devices is promoted, and the lithium battery is excellent in terms of production cost and productivity.

Regarding the solid electrolyte material used in all solid lithium batteries, sulfide solid electrolyte materials are known. For example, Patent Literature 1 discloses a LiSiPS-based sulfide solid electrolyte material (argyrodite type). Also, for example, Patent Literature 2 discloses a sulfide solid electrolyte material having a composition of $Li_{(4-x)}Ge_{(1-x)}P_xS_4$.

CITATION LIST

Patent Literatures

Patent Literature 1: Japanese Patent Application Publication (JP-A) No. 2013-137889
Patent Literature 2: WO 2011/118801

SUMMARY OF INVENTION

Technical Problem

From the viewpoint of increasing the output power of batteries, there is a demand for a solid electrolyte material having satisfactory ion conductivity. The present invention was achieved in view of the problems described above, and it is a primary object of the present invention to provide a sulfide solid electrolyte material having satisfactory ion conductivity.

Solution to Problem

In order to solve the problem described above, the present invention provides a sulfide solid electrolyte material comprising a Li element, a Si element, a P element, a S element, and an X element (in which X represents at least one of F, Cl, Br, and I), wherein the sulfide solid electrolyte material has a crystal phase B that has a peak at a position of $2\theta=30.12°\pm1.00°$ measured by X-ray diffractometry using CuKα ray.

According to the present inventions, a sulfide solid electrolyte material having satisfactory ion conductivity can be obtained because the solid electrolyte material comprises a Li element, a Si element, a P element, a S element, and an X element, and has the crystal phase B.

In regard to the invention described above, it is preferable that the sulfide solid electrolyte material has a crystal phase A having a peak at a position of $2\theta=29.58°\pm1.00°$ measured by X-ray diffractometry using CuKα ray.

In regard to the invention described above, it is preferable that when a diffraction intensity of the peak at $2\theta=29.58°\pm1.00°$ is designated as $I_A$, and a diffraction intensity of the peak at $2\theta=30.12°\pm1.00°$ is designated as $I_B$, a value of a ratio $I_A/I_B$ be 1.3 or less.

In regard to the invention described above, it is preferable that the sulfide solid electrolyte material have a composition of $y(LiX)\cdot(100-y)(Li_{(4-x)}Si_{(1-x)}P_xS_4)$ (in which x satisfies x=0.6, and y satisfies the relationship: $20 \leq y \leq 60$).

In regard to the invention described above, it is preferable that η represented by the following formula satisfy the relationship: $8.2 \leq \eta \leq 9.5$:

$$\eta = \Sigma_{I=1}^{N} v_I m_I / \Sigma m_\alpha,$$

in which $v_I$ represents a valence of a cationic element; $m_I$ represents a number of moles of the cationic element; N represents a total number of cation species included in the sulfide solid electrolyte material; and $m_\alpha$ represents a number of moles of cationic elements excluding Li.

In regard to the invention described above, it is preferable that γ represented by the following formula satisfy the relationship: $3.6 \leq \gamma \leq 4.9$.

In regard to the invention described above, it is preferable that X represents Cl.

Furthermore, the present invention provides a battery comprising a cathode active material layer containing a cathode active material; an anode active material layer containing an anode active material; and an electrolyte layer formed between the cathode active material layer and the anode active material layer, wherein at least one of the cathode active material layer, the anode active material layer and the electrolyte layer contains the sulfide solid electrolyte material described above.

According to the present invention, a high output power battery can be obtained by using the sulfide solid electrolyte material described above.

Furthermore, the present invention provides a method for producing the aforementioned sulfide solid electrolyte material, comprising steps of: an ion conductive material synthesis step of synthesizing an amorphized ion conductive material by mechanical milling using a raw material composition containing a constituent component of the sulfide solid electrolyte material; and a heating step of obtaining the sulfide solid electrolyte material by heating the amorphized ion conductive material.

According to the present invention, a sulfide solid electrolyte material having satisfactory ion conductivity can be obtained by performing amorphization in the ion conductive material synthesis step, and subsequently performing the heating step.

Advantageous Effects of Invention

The sulfide solid electrolyte material of the present invention provides an effect that ion conductivity is satisfactory.

BRIEF DESCRIPTION OF DRAWINGS

The patent or application file contains at least one drawing executed in color. Copies of this patent or patent application publication with color drawings will be provided by the Office upon request and payment of the necessary fee.

DESCRIPTION OF EMBODIMENTS

Hereinafter, the sulfide solid electrolyte material, the battery, and the method for producing a sulfide solid electrolyte material of the present invention are described in detail.

A. Sulfide Solid Electrolyte Material

First, the sulfide solid electrolyte material of the present invention is explained. The sulfide solid electrolyte material of the present invention comprises a Li element, a Si element, a P element, a S element, and an X element (in which X represents at least one of F, Cl, Br and I), and has a crystal phase B having a peak at the position of $2\theta=30.12°\pm1.00°$ measured by X-ray diffractometry using CuKα ray.

According to the present invention, a sulfide solid electrolyte material having satisfactory ion conductivity can be obtained because the sulfide solid electrolyte material comprises a Li element, a Si element, a P element, a S element and an X element, and has the crystal phase B. Incidentally, the sulfide solid electrolyte material of the present invention is a novel material that is not known in the related art. The reason why a sulfide solid electrolyte material having satisfactory ion conductivity is obtained is not perfectly known; however, there is a possibility that the influence of interaction between sulfur and lithium may be reduced as a portion of sulfur (S) is substituted with a halogen (X).

The sulfide solid electrolyte material of the present invention has a crystal phase B having a peak at the position of $2\theta=30.12°\pm1.00°$ measured by X-ray diffractometry using CuKα ray. The crystal phase B may be regarded as an argyrodite type crystal phase, and has high ion conductivity. The crystal phase B usually has peaks at the positions of $2\theta=15.60°$, $18.04°$, $25.60°$, $30.12°$, $31.46°$, $45.26°$, $48.16°$, and $52.66°$.

Incidentally, these peak positions may approximate to the above-described values in the range of ±1.00°, because the crystal lattice slightly changes due to factors such as the material composition. Among others, it is preferable that the position of each peak vary within the range of ±0.50°.

As a means for identifying the crystal phase B, it is effective to specify the positions of the peaks; however, it is also effective to specify the crystal phase B from the peak intensity ratio of two particular peaks. Here, when the diffraction intensity of a peak near $2\theta=30.12°$ is designated as $I_1$, and the diffraction intensity of a peak near $2\theta=31.46°$ is designated as $I_2$, the value of $I_1/I_2$ is not particularly limited, but for example, the value of the ratio is preferably in the range of 1.4 to 2.8.

The proportion of the crystal phase B with respect to all the crystal phases included in the sulfide solid electrolyte material of the present invention is not particularly limited; however, for example, the proportion may be 10 wt %, or more, may be 30 wt % or more, may be 50 wt % or more, may be 70 wt % or more, or may be 90 wt % or more. Incidentally, the proportion of a crystal phase can be measured by, for example, synchrotron radiation X-ray diffraction (XRD).

It is preferable that the sulfide solid electrolyte material of the present invention have a crystal phase A having a peak at the position of $2\theta=29.58°\pm1.00°$, in addition to the crystal phase B. The crystal phase A is the same crystal phase as the LiGePS-based sulfide solid electrolyte material described in Patent Literature 1, and has high ion conductivity. The crystal phase A usually has peaks at the positions of $2\theta=17.38°$, $20.18°$, $20.44°$, $23.56°$, $23.96°$, $24.93°$, $26.96°$, $29.07°$, $29.58°$, $31.71°$, $32.66°$, and $33.39°$. Incidentally, these peak positions may approximate to the above-described values in the range of ±1.00°, because the crystal lattice slightly changes due to factors such as the material composition. Among others, it is preferable that the position of each peak vary within the range of ±0.50°.

Figure 1:
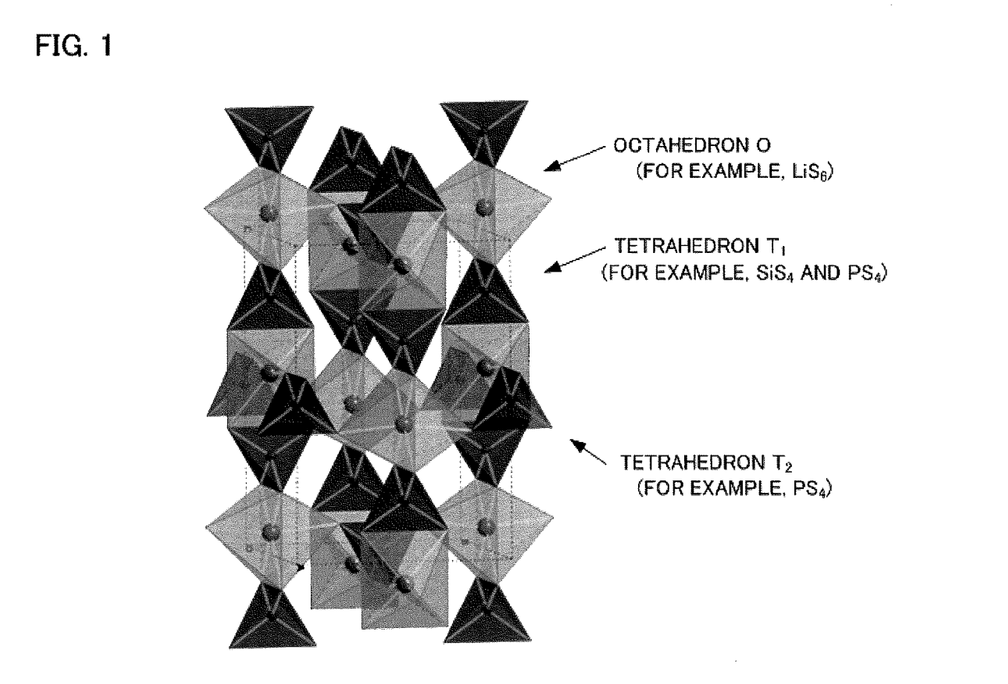
FIG. 1 is a perspective view diagram explaining an example of the crystal structure of the crystal phase A according to the present invention.

FIG. 1 is a perspective view diagram explaining an example of the crystal structure of the crystal phase A. The crystal phase A has an octahedron O composed of a Li element and a S element; a tetrahedron $T_1$ composed of a $M_a$ element and a S element; and a tetrahedron $T_2$ composed of a $M_b$ element and a S element, and has a crystal structure in which the tetrahedron $T_1$ and the octahedron O share edges, and the tetrahedron $T_2$ and the octahedron O share corners. At least one of the $M_a$ element and the $M_b$ element includes a Si element, and similarly, at least one of the $M_a$ element and the $M_b$ element includes a P element.

The proportion of the crystal phase A with respect to all the crystal phases included in the sulfide solid electrolyte material of the present invention is not particularly limited; however, for example, the proportion may be 10 wt % or more, may be 30 wt % or more, may be 50 wt % or more, may be 70 wt %, or more, or may be 90 wt % or more. Incidentally, the proportion of a crystal phase can be measured by, for example, synchrotron radiation XRD.

The proportions of the crystal phase A and the crystal phase B are not particularly limited. When the diffraction intensity of a peak of the crystal phase A (peak near $2\theta=29.58°$) is designated as $I_A$, and the diffraction intensity of a peak of the crystal phase B (peak near $2\theta=30.12°$) is designated as $I_B$, the value of the ratio $I_A/I_B$ is, for example, preferably 2 or less, may be 1.7 or less, may be 1.5 or less, or may be 1.3 or less. On the other hand, the value of $I_A/I_B$ is, for example, larger than 0, may be 0.1 or more, may be 0.3 or more, or may be 0.5 or more. It is speculated that when the value of the ratio $I_A/I_B$ is in a predetermined range, consistency of the lattices between the crystal phases is improved, and Li can be easily diffused.

Furthermore, as described in Patent Literature 1, there is a possibility that at the time of precipitation of the crystal phase A, a crystal phase having lower ion conductivity than that of the crystal phase A may be precipitated. When this crystal phase is designated as crystal phase C, the crystal phase C usually has peaks at 2θ=17.46°, 18.12°, 19.99°, 22.73°, 25.72°, 27.33°, 29.16°, and 29.78°. Incidentally, these peak positions may also approximate to the above-described values in the range of ±1.00°. Here, when the diffraction intensity of a peak of the crystal phase A (peak near 2θ=29.58°) is designated as $I_A$, and the diffraction intensity of a peak of the crystal phase C (peak near 2θ=27.33°) is designated as $I_C$, the value of the ratio $I_C/I_A$ is, for example, less than 0.50, preferably 0.45 or less, more preferably 0.25 or less, even more preferably 0.15 or less, and particularly preferably 0.07 or less. Furthermore, the value of the ratio $I_C/I_A$ is preferably 0. In other words, it is preferable that the sulfide solid electrolyte material of the present invention do not have a peak near 2θ=27.33°.

Furthermore, the sulfide solid electrolyte material of the present invention comprises a Li element, a Si element, a P element, a S element, and an X element (in which X represents at least one of F, Cl, Br and I). The sulfide solid electrolyte material of the present invention may comprise only the Li element, Si element, P element, S element and X element, or may further comprise other elements. Si has higher reduction-resistance compared with, for example, Ge or Sn. The X element is preferably at least one of Cl, Br and I, and more preferably Cl.

Furthermore, the composition of the sulfide solid electrolyte material of the present invention is not particularly limited; however, it is preferable that the composition be represented by, for example, y(LiX)·(100−y) ($Li_{(4-x)}Si_{(1-x)}P_xS_4$). It is because a sulfide solid electrolyte material having high ion conductivity can be obtained. The composition of $Li_{(4-x)}Si_{(1-x)}P_xS_4$ corresponds to the composition of a solid solution of $Li_3PS_4$ and $Li_4SiS_4$. That is, this composition corresponds to the composition on the tie line of $Li_3PS_4$ and $Li_4SiS_4$. $Li_3PS_4$ and $Li_4SiS_4$ both correspond to the ortho-composition, and have an advantage of having high chemical stability.

Furthermore, it is preferable that "x" in $Li_{(4-x)}Si_{(1-x)}P_xS_4$ satisfies the relationship: 0.55≤x, and it is more preferable that "x" satisfies the relationship: 0.6≤x. On the other hand, it is preferable that this "x" satisfies the relationship: x≤0.7, and it is more preferable that "x" satisfies the relationship: x≤0.65. It is because a sulfide solid electrolyte material having more satisfactory ion conductivity can be obtained. It is preferable that "y" satisfies the relationship: 10<y, more preferably the relationship: 15≤y, and even more preferably the relationship: 20≤y. On the other hand, it is preferable that "y" satisfies the relationship: y≤60, more preferably the relationship: y≤50, and even more preferably the relationship: y≤40. It is particularly preferable that "y" satisfies the relationship: y≤30.

Furthermore, in order to evaluate the influence of the valence of a cation in the sulfide solid electrolyte material, η is defined as follows:

$$\eta = \Sigma_{I=1}^{N} v_I m_I / \Sigma m_\alpha$$

in which $v_I$ represents the valence of a cationic element; $m_I$ represents the number of moles of the cationic element; N represents the total number of cation species included in the sulfide solid electrolyte material; and $m_\alpha$ represents the number of moles of cationic elements excluding Li.

For example, in the case of a sulfide solid electrolyte material represented by LiSiPSX, η can be calculated as follows:

$$\eta = (1 \times m_{Li} + 4 \times m_{Si} + 5 \times m_P)/(m_{Si} + m_P)$$

It is preferable that η satisfies the relationship: 8.11<η, and it is more preferable that η satisfies the relationship: 8.2≤η. On the other hand, it is preferable that η satisfies the relationship: η≤9.5, and it is more preferable that η satisfies the relationship: η≤9. It is speculated that when the value of q is in a predetermined range, the valence of cations of the sulfide solid electrolyte material (particularly, crystal phase A) acquires an appropriate value, the interaction with the lattices is reduced, and Li can be easily diffused.

Furthermore, in order to evaluate the influence of the amount of lithium in the sulfide solid electrolyte material, γ is defined as follows:

$$\gamma = m_{Li}/\Sigma m_\alpha$$

in which $m_{Li}$ represents the number of moles of the Li element; and $m_\alpha$ represents the number of moles of cationic elements excluding Li.

For example, in the case of a sulfide solid electrolyte material represented by LiSiPSX, γ can be calculated as follows:

$$\gamma = m_{Li}/(m_{Si} + m_P)$$

It is preferable that γ satisfies the relationship: 3.51<γ, and it is more preferable that γ satisfies the relationship: 3.6≤γ. On the other hand, it is preferable that γ satisfies the relationship: γ≤4.9, more preferably the relationship: γ≤4.4, and even more preferably the relationship: γ≤3.9. It is speculated that when the value of γ is in a predetermined range, the amount of lithium included in the sulfide solid electrolyte material (particularly, crystal phase B) is at an appropriate level, and the diffusion paths are not easily blocked.

The sulfide solid electrolyte material of the present invention is usually a sulfide solid electrolyte material having crystallinity. Also, it is preferable that the sulfide solid electrolyte material of the present invention have high ion conductivity, and it is preferable that the ion conductivity of the sulfide solid electrolyte material at 25° C. be $2.5 \times 10^{-3}$ S/cm or more. Furthermore, the shape of the sulfide solid electrolyte material of the present invention is not particularly limited, but an example thereof may be a powdered form. Moreover, it is preferable that the average particle size ($D_{50}$) of a powdered sulfide solid electrolyte material be, for example, in the range of 0.1 μm to 50 μm.

Since the sulfide solid electrolyte material of the present invention has high ion conductivity, the sulfide solid electrolyte material can be used in any applications where ion conductivity is required. Among them, it is preferable that the sulfide solid electrolyte material of the present invention be used in batteries. It is because the sulfide solid electrolyte material can contribute to an increase in the output power of batteries to a large extent. Also, in regard to the method for producing the sulfide solid electrolyte material of the present invention will be described in detail in section "C. Method for producing sulfide solid electrolyte material" that is described below.

B. Battery

Figure 2:
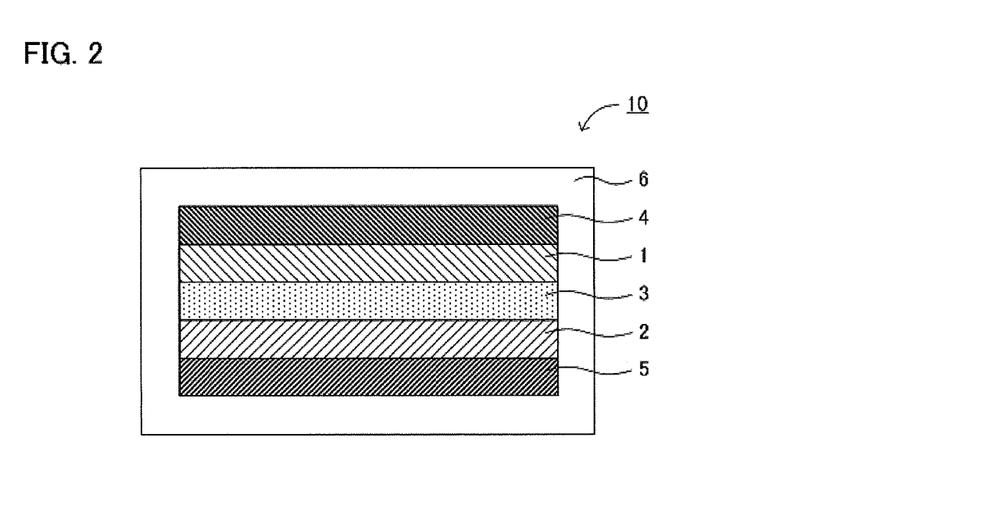
FIG. 2 is an outline cross-sectional diagram illustrating an example of the battery of the present invention.

Next, the battery of the present invention is explained. FIG. 2 is an outline cross-sectional diagram illustrating an example of the battery of the present invention. The battery 10 in FIG. 2 comprises a cathode active material layer 1 containing a cathode active material; an anode active material layer 2 containing an anode active material; an electrolyte layer 3 formed between the cathode active material layer 1 and the anode active material layer 2; a cathode current collector 4 that performs current collection of the cathode active material layer 1; an anode current collector 5 that performs current collection of the anode active material layer 2; and a battery case 6 that accommodates these members. A major feature of the present invention is that at least one of the cathode active material layer 1, anode active material layer 2 and electrolyte layer 3 contains the sulfide solid electrolyte material described in the above section "A. Sulfide solid electrolyte material".

According to the present invention, a high output power battery can be obtained by using the sulfide solid electrolyte material described above.

Hereinafter, the configuration of the battery of the present invention is explained.

1. Cathode Active Material Layer

The cathode active material layer according to the present invention is a layer containing at least a cathode active material, and may optionally contain at least one of a solid electrolyte material, a conductive material, and a binder. Particularly, according to the present invention, it is preferable that the cathode active material layer contains a solid electrolyte material, and that the solid electrolyte material be the sulfide solid electrolyte material described above. The proportion of the sulfide solid electrolyte material included in the cathode active material layer may vary with the kind of the battery; however, for example, the proportion is preferably in the range of 0.1 vol to 80 vol %, more preferably in the range of 1 vol % to 60 vol %, and particularly preferably in the range of 10 vol % to 50 vol %. Furthermore, examples of the cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$, and $LiNi_{1/3}CO_{1/3}Mn_{1/3}O_2$.

The cathode active material layer may further contain a conductive material. Electrical conductivity of the cathode active material layer can be enhanced by adding a conductive material. Examples of the conductive material include acetylene black, Ketjen black, and carbon fibers. Furthermore, the cathode active material layer may contain a binder. An example of the kind of the binding material is a fluorine-containing binding material such as polyvinylidene fluoride (PVDF). Furthermore, the thickness of the cathode active material layer is preferably, for example, in the range of 0.1 μm to 1000 μm.

2. Anode Active Material Layer

The anode active material layer according to the present invention is a layer containing at least an anode active material, and may optionally contain at least one of a solid electrolyte material, a conductive material, and a binder. Particularly, according to the present invention, it is preferable that the anode active material layer contains a solid electrolyte material, and that the solid electrolyte material be the sulfide solid electrolyte material described above. The proportion of the sulfide solid electrolyte material included in the anode active material layer may vary with the kind of the battery; however, for example, the proportion is preferably in the range of 0.1 vol % to 80 vol %, more preferably in the range of 1 vol % to 60 vol %, and particularly preferably in the range of 10 vol % to 50 vol %. Furthermore, examples of the anode active material include metal active materials and carbon active materials. Examples of the metal active materials include In, Al, Si, and Sn. On the other hand, examples of the carbon active materials include mesocarbon microbeads (MCMB), highly oriented pyrolytic graphite (HOPG), hard carbon, and soft carbon.

Incidentally, the conductive material and the binder used in the anode active material layer are similar to those materials in the case of the cathode active material layer described above. The thickness of the anode active material layer is preferably, for example, in the range of 0.1 μm to 1000 μm.

3. Electrolyte Layer

The electrolyte layer according to the present invention is a layer formed between the cathode active material layer and the anode active material layer. The electrolyte layer is not particularly limited as long as it is a layer capable of performing conduction of ions; however, the electrolyte layer is preferably a solid electrolyte layer formed from a solid electrolyte material. It is because a battery having higher safety compared with a battery using a liquid electrolyte can be obtained. Furthermore, in the present invention, it is preferable that the solid electrolyte layer contains the sulfide solid electrolyte material described above. The proportion of the sulfide solid electrolyte material included in the solid electrolyte layer is preferably, for example, in the range of 10 vol % to 100 vol %, and more preferably in the range of 50 vol % to 100 vol %. The thickness of the solid electrolyte layer is preferably, for example, in the range of 0.1 μm to 1000 μm, and more preferably in the range of 0.1 μm to 300 μm. Furthermore, examples of the method for forming the solid electrolyte layer include a method of compression molding a solid electrolyte material.

Furthermore, the electrolyte layer according to the present invention may also be a layer formed from a liquid electrolyte. In the case of using a liquid electrolyte, it is necessary to take more caution of safety compared with the case of using a solid electrolyte layer; however, a battery with higher output power can be obtained. Furthermore, in this case, usually, at least one of the cathode active material layer and the anode active material layer contains the sulfide solid electrolyte material described above. A liquid electrolyte usually contains a lithium salt and an organic solvent (non-aqueous solvent). Examples of the lithium salt include inorganic lithium salts such as $LiPF_6$, $LiBF_4$, $LiClO_4$, and $LiAsF_6$; and organic lithium salts such as $LiCF_3SO_3$, $LiN(CF_3SO_2)_2$, $LiN(C_2F_5SO_2)_2$, and $LiC(CF_3SO_2)_3$. Examples of the organic solvent include ethylene carbonate (EC), propylene carbonate (PC), dimethyl carbonate (DMC), diethyl carbonate (DEC), ethyl methyl carbonate (EMC), and butylene carbonate (BC).

4. Other Configuration

The battery of the present invention comprises at least the cathode active material layer, the electrolyte layer, and the anode active material layer described above. Furthermore, the battery usually includes a cathode current collector that performs current collection of the cathode active material layer, and an anode current collector that performs current collection of the anode active material layer. Examples of the material for the cathode current collector include SUS, aluminum, nickel, iron, titanium, and carbon. On the other hand, examples of the material for the anode current collector include SUS, copper, nickel, and carbon. Furthermore, it is preferable that the thickness, shape and the like of the cathode current collector and the anode current collector be appropriately selected in accordance with factors such as the use of the battery. Also, for the battery case used in the present invention, a battery case for any general battery can be used. Examples of the battery case include a battery case made of SUS.

5. Battery

The battery of the present invention may be a primary battery, or may be a secondary battery; however, among others, the battery is preferably a secondary battery. It is because a secondary battery can be repeatedly charged and discharged, and is useful as, for example, a battery for vehicles. Examples of the shape of the battery of the present invention include a coin type, a laminate type, a cylinder type, and a box type. Also, the method for producing the battery of the present invention is not particularly limited as long as it is a method capable of obtaining the battery described above, and any method similar to a general method for producing a battery can be used. For example, in a case where the battery of the present invention is an all solid state battery, an example of the production method thereof is a method of producing a power generating element by sequentially pressing a material that constitutes a cathode active material layer, a material that constitutes a solid electrolyte layer, and a material that constitutes an anode active material layer, accommodating this power generating element in a battery case, and caulking the battery case.

C. Method for producing a sulfide solid electrolyte material

Next, the method for producing a sulfide solid electrolyte material of the present invention is explained. The method for producing a sulfide solid electrolyte material of the present invention is a method for producing the sulfide solid electrolyte material described above, and comprises steps of: an ion conductive material synthesis step of synthesizing an amorphized ion conductive material by mechanical milling using a raw material composition containing the constituent components of the sulfide solid electrolyte material; and a heating step of heating the amorphized ion conductive material and thereby obtaining the sulfide solid electrolyte material.

Figure 3:
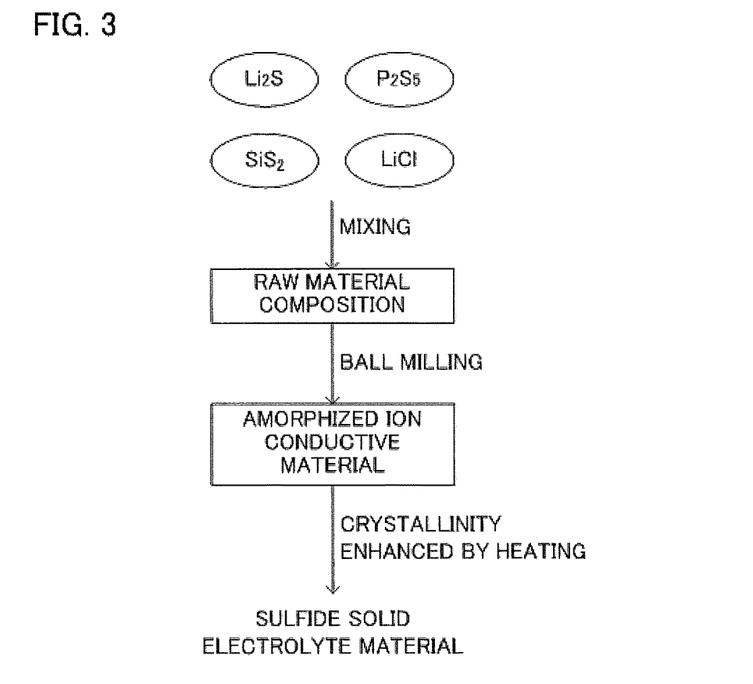
FIG. 3 is an explanatory diagram illustrating an example of the method for producing the sulfide solid electrolyte material of the present invention.

FIG. 3 is an explanatory diagram illustrating an example of the method for producing a sulfide solid electrolyte material of the present invention. In the method for producing a sulfide solid electrolyte material according to FIG. 3, first, a raw material composition is produced by mixing $Li_2S$, $P_2S_5$, $SiS_2$, and LiCl. At this time, it is preferable to produce the raw material composition in an inert gas atmosphere, in order to prevent deterioration of the raw material composition caused by the moisture in air. Subsequently, the raw material composition is subjected to ball milling, and thus an amorphized ion conductive material is obtained. Subsequently, the amorphized ion conductive material is heated, and crystallinity is enhanced. Thereby, a sulfide solid electrolyte material is obtained.

According to the present invention, a sulfide solid electrolyte material having satisfactory ion conductivity can be obtained by performing amorphization in the ion conductive material synthesis step, and subsequently performing the heating step.

Hereinafter, the steps of the method for producing a sulfide solid electrolyte material of the present invention will be respectively explained.

1. Ion Conductive Material Synthesis Step

The ion conductive material synthesis step according to the present invention is a step of synthesizing an amorphized ion conductive material by mechanical milling using a raw material composition containing the constituent components of the sulfide solid electrolyte material.

The raw material composition according to the present invention includes at least a Li element, a Si element, a P element, a S element, and an X element (in which X represents at least one of F, Cl, Brand I). Furthermore, the raw material composition may also include other elements described above. Examples of a compound containing the Li element include sulfides of Li. A specific example of the sulfides of Li may be $Li_2S$.

Examples of a compound containing the Si element include simple Si, and sulfides of Si. A specific example of the sulfides of Si may be $SiS_2$. Also, examples of a compound containing the P element include simple P, and sulfides of P. A specific example of the sulfides of P may be $P_2S_5$. Examples of a compound containing the X element include LiX and $LiPX_4$. Furthermore, for the other elements that are used in the raw material composition as well, simple substances or sulfides can be used.

Mechanical milling is a method of pulverizing a sample while applying mechanical energy thereto. According to the present invention, an amorphized ion conductive material is synthesized by applying mechanical energy to a raw material composition. Examples of such a mechanical milling method include vibration milling, ball milling, turbo milling, Mechanofusion, and disc milling, and among them, vibration milling and ball milling are preferred.

The conditions for vibration milling are not particularly limited as long as an amorphized ion conductive material can be obtained. The amplitude of vibration of the vibration mill is preferably, for example, in the range of 5 mm to 15 mm, and more preferably in the range of 6 mm to 10 mm. The frequency of vibration of the vibration mill is preferably, for example, in the range of 500 rpm to 2000 rpm, and more preferably in the range of 1000 rpm to 1800 rpm. The packing ratio of the sample in the vibration mill is preferably, for example, in the range of 1 vol % to 80 vol %, more preferably in the range of 5 vol % to 60 vol %, and particularly preferably in the range of 10 vol % to 50 vol %. Furthermore, it is preferable to use a vibrator (for example, a vibrator made of alumina) for the vibration milling.

The conditions for ball milling are not particularly limited as long as an amorphized ion conductive material can be obtained. In general, as the speed of rotation is higher, the rate of production of the ion conductive material is increased, and as the treatment time is prolonged, the conversion ratio from the raw material composition to the ion conductive material is increased. The speed of table rotation at the time of performing planetary ball milling is preferably, for example, in the range of 200 rpm to 500 rpm, and more preferably in the range of 250 rpm to 400 rpm. Also, the treatment time at the time of performing planetary ball milling is preferably, for example, in the range of 1 hour to 100 hours, and more preferably in the range of 1 hour to 70 hours.

2. Heating Step

The heating step according to the present invention is a step of heating the amorphized ion conductive material, and thereby obtaining the sulfide solid electrolyte material.

The heating temperature according to the present invention is not particularly limited as long as it is a temperature at which the desired sulfide solid electrolyte material can be obtained; however, for example, the heating temperature is preferably 300° C. or higher, more preferably 350° C. or higher, even more preferably 400° C. or higher, and particularly preferably 450° C. or higher. On the other hand, the heating temperature is preferably, for example, 1000° C. or lower, more preferably 700° C. or lower, even more preferably 650° C. or lower, and particularly preferably 600° C. or lower. Also, it is preferable that the heating time be appropriately adjusted so as to obtain the desired sulfide solid electrolyte material. Furthermore, from the viewpoint of preventing oxidation, heating according to the present invention is preferably carried out in an inert gas atmosphere or in a vacuum. In regard to the sulfide solid electrolyte material obtainable by the present invention, since the same matters as those described in the above section "A. Sulfide solid electrolyte material" are similarly applicable, further description thereof will not be repeated here.

Incidentally, the present invention is not intended to be limited to the embodiment described above. The above-described embodiment is only for illustrative purposes, and any embodiment, that has substantially the same configuration as the technical idea described in the claims of the present invention and provides the same operating effects, is construed to be included in the technical scope of the present invention.

C. for 8 hours. Thereafter, the quartz tube was slowly cooled to room temperature. Thereby, a sulfide solid electrolyte material having the composition of $1.5(LiCl) \cdot (Li_{3.4}Si_{0.4}P_{0.6}S_4)$ was obtained. Incidentally, the aforementioned composition corresponds to the composition of $y(LiCl) \cdot (100-y)(Li_{(4-x)}Si_{(1-x)}P_xS_4)$, in which $x=0.6$ and $y=60$.

Examples 2 to 5 and Reference Examples 1 and 2

Figure 4:
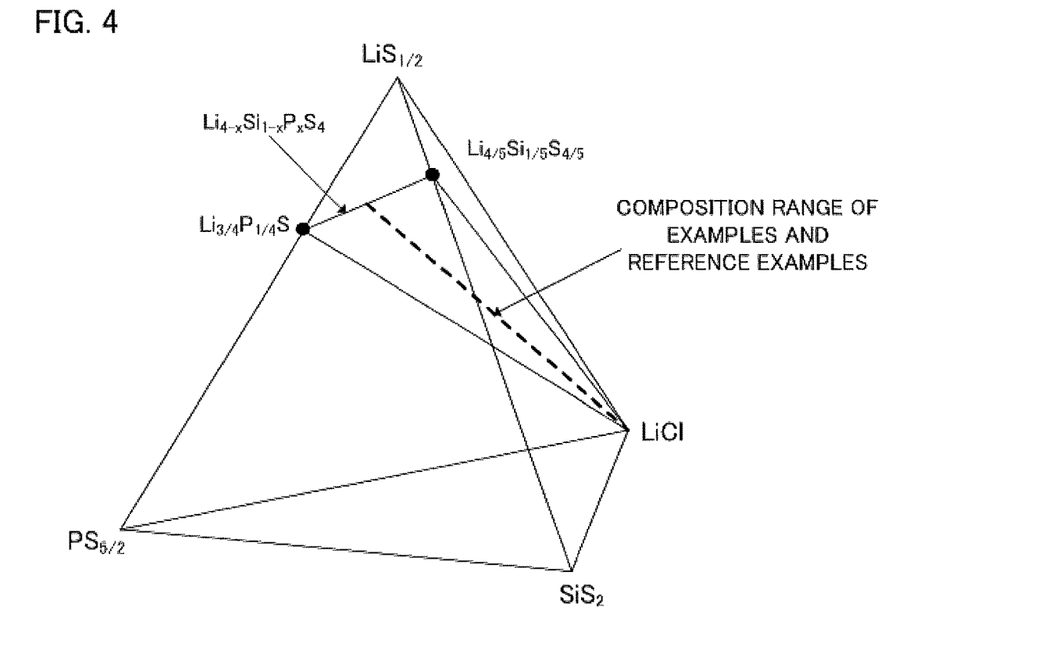
FIG. 4 is a quaternary diagram illustrating the compositions of the sulfide solid electrolyte materials each obtained in Examples 1 to 5 and Reference Examples 1 and 2.

Sulfide solid electrolyte materials were obtained in the same manner as in Example 1, except that the proportions of the raw material compositions were changed to the proportions indicated in the following Table 1. Incidentally, only in Reference Example 1, the calcination temperature was adjusted to 550° C. Incidentally, FIG. 4 is a quaternary diagram showing the composition ranges of the sulfide solid electrolyte materials each obtained in Examples 1 to 5 and Reference Examples 1 and 2.

TABLE 1

|  | REFERENCE EXAMPLE 2 | REFERENCE EXAMPLE 1 | EXAMPLE 5 | EXAMPLE 4 | EXAMPLE 3 | EXAMPLE 2 | EXAMPLE 1 |
|---|---|---|---|---|---|---|---|
| x | 0.6 | 0.6 | 0.6 | 0.6 | 0.6 | 0.6 | 0.6 |
| y | 0 | 10 | 20 | 30 | 40 | 50 | 60 |
| $Li_2S$ | 0.429936 | 0.419071 | 0.406238 | 0.390849 | 0.372057 | 0.348593 | 0.318466 |
| $P_2S_5$ | 0.367033 | 0.357757 | 0.346802 | 0.333665 | 0.317622 | 0.297591 | 0.271872 |
| $SiS_2$ | 0.203031 | 0.1979 | 0.191839 | 0.184572 | 0.175698 | 0.164618 | 0.150391 |
| LiCl | 0 | 0.025272 | 0.055121 | 0.090914 | 0.134622 | 0.189198 | 0.259271 |

EXAMPLES

Hereinafter, the present invention will be explained more specifically by way of Examples.

Example 1

Lithium sulfide ($Li_2S$, manufactured by Nippon Chemical Industrial Co., Ltd.), diphosphorus pentasulfide ($P_2S_5$, manufactured by Sigma-Aldrich Co. LLC.), silicon sulfide ($SiS_2$, manufactured by Kojundo Chemical Lab Co., Ltd.), and lithium chloride (LiCl, manufactured by Kojundo Chemical Lab Co., Ltd.) were used as starting raw materials. Powders of these compounds were mixed at the proportions indicated in the following Table 1 in a glove box in an argon atmosphere, and thus a raw material composition was obtained. Subsequently, 1 g of the raw material composition was introduced into a pot (45 ml) made of zirconia together with zirconia balls (10 mmϕ, 10 balls), and the pot was completely sealed (argon atmosphere). This pot was mounted in a planetary ball milling machine (P7™ manufactured by Fritsch Japan Co., Ltd.), and mechanical milling was carried out for 40 hours at a speed of table rotation of 370 rpm. Thereby, an amorphized ion conductive material was obtained.

Subsequently, a powder of the ion conductive material thus obtained was introduced into a carbon-coated quartz tube, and the tube was vacuum sealed. The pressure of the vacuum sealed quartz tube was about 30 Pa. Subsequently, the quartz tube was installed in a calcining furnace, the temperature was increased from room temperature to 400° C. over 6 hours, and the quartz tube was maintained at 400°

[Evaluation]

(X-Ray Diffractometry)

Figure 5:
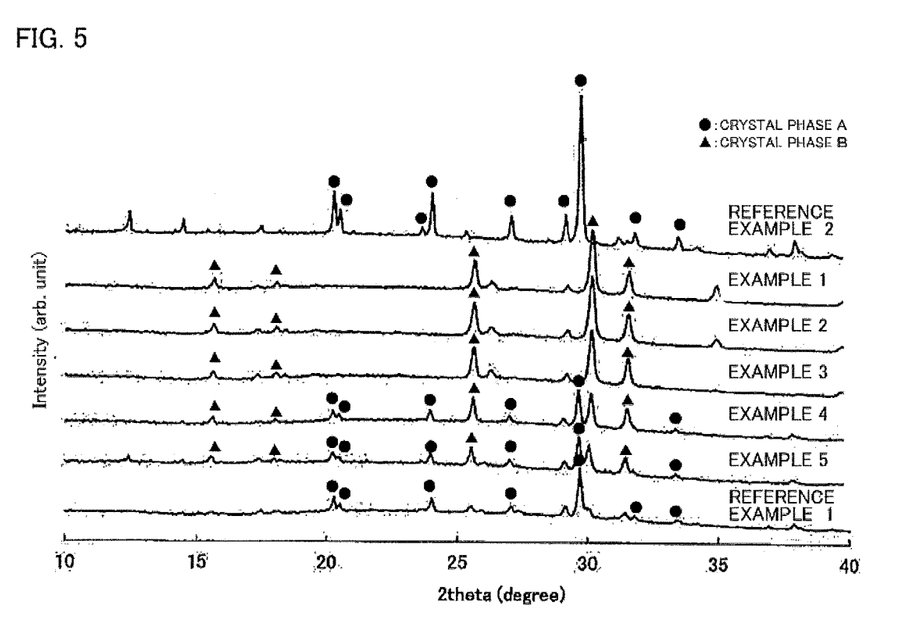
FIG. 5 is X-ray diffraction spectra of the sulfide solid electrolyte materials each obtained in Examples 1 to 5 and Reference Examples 1 and 2.
Figure 6:
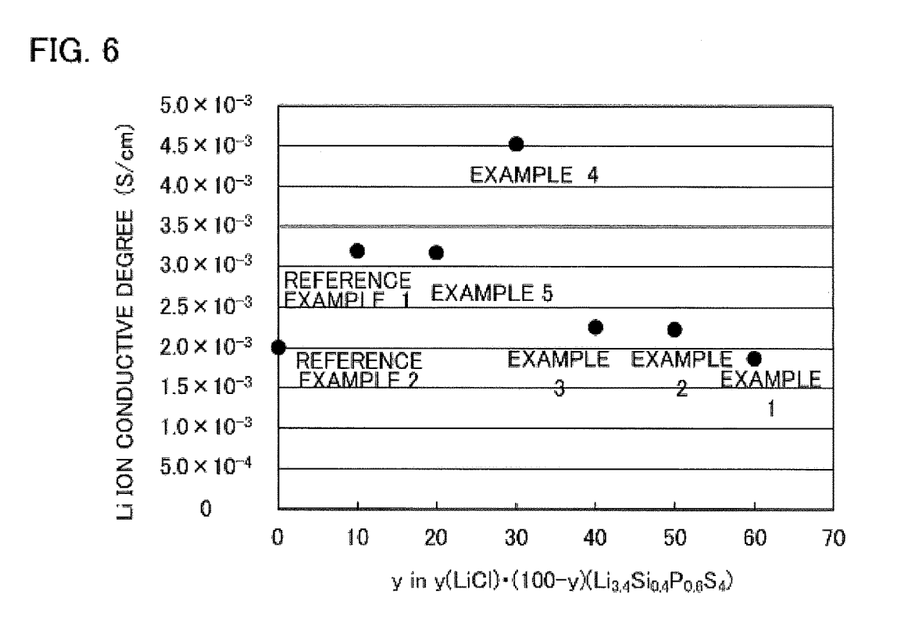
FIG. 6 is a graph illustrating the relationship between the amount of addition y of LiCl and the Li ion conductive degree.
Figure 7:
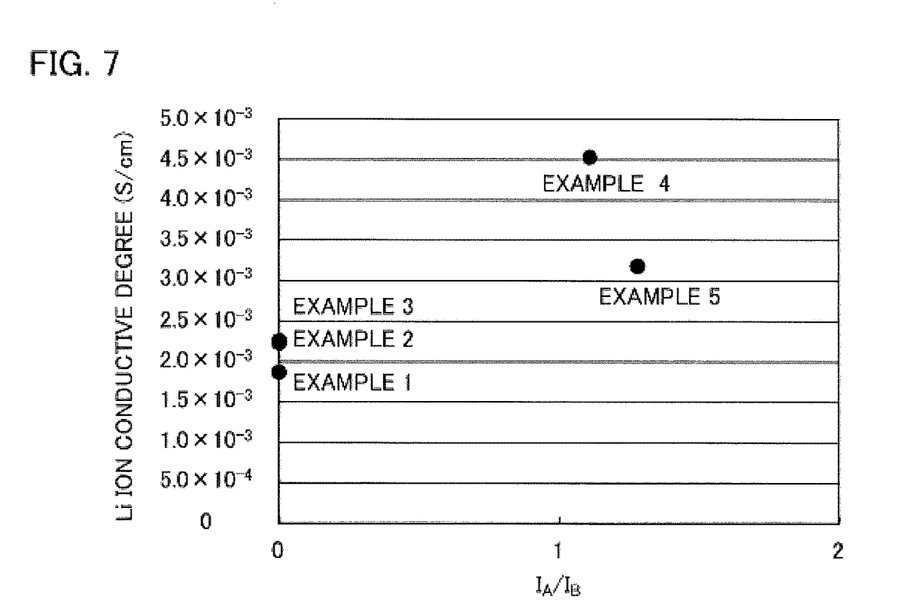
FIG. 7 is a graph illustrating the relationship between the ratio $I_A/I_B$ and the Li ion conductivity.
Figure 8:
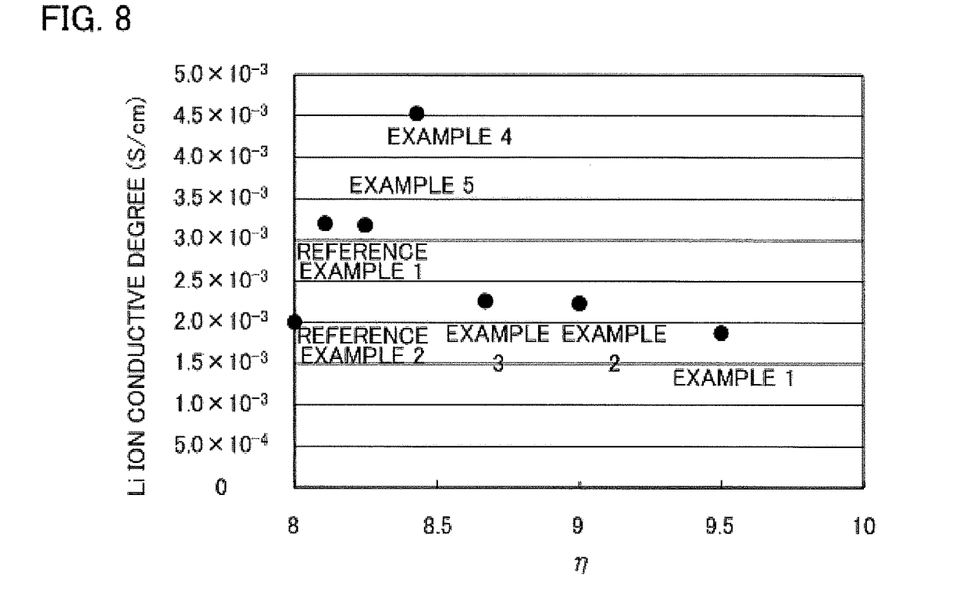
FIG. 8 is a graph illustrating the relationship between η that is related to the valence of a cation and the Li ion conductive degree.
Figure 9:
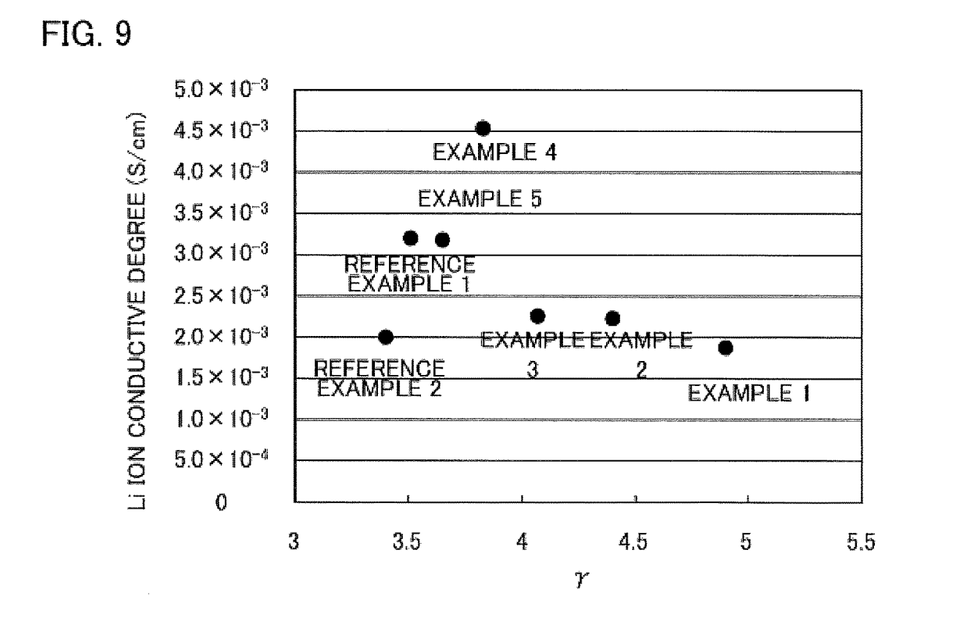
FIG. 9 is a graph illustrating the relationship between γ that is related to the amount of lithium and the Li ion conductive degree.

X-ray diffractometry (XRD) was carried out using the sulfide solid electrolyte materials obtained in Examples 1 to 5 and Reference Examples 1 and 2. The XRD analysis was carried out using powdered samples in an inert atmosphere under the conditions of using CuKα ray. The results are presented in FIG. 5. As illustrated in FIG. 5, the crystal phase B was precipitated in Examples 1 to 3, and the crystal phase A and the crystal phase B were precipitated in Examples 4 and 5. Furthermore, the crystal phase A was precipitated in Reference Examples 1 and 2. Incidentally, the crystal phase C was not precipitated in all of the sulfide solid electrolyte materials.

(Measurement of Li Ion Conductive Degree)

The Li ion conductive degree was measured at 25° C. using the sulfide solid electrolyte materials each obtained in Examples 1 to 5 and Reference Examples 1 and 2. First, 200 mg of a sulfide solid electrolyte material was weighed and introduced into a cylinder made of MACOR, and the sulfide solid electrolyte material was pressed at a pressure of 4 ton/cm². Two ends of a pellet thus obtained were placed between pins made of SUS, a confining pressure was applied to the pellet by bolting, and thus a cell for evaluation was obtained. While the cell for evaluation was maintained at 25° C., the Li ion conductive degree was calculated by the alternating current impedance method. The measurement was carried out using a SOLARTRON 1260™, under the conditions of an applied voltage of 5 mV and a measurement frequency range of 0.01 to 1 MHz. The results are presented in FIG. 6 to FIG. 9 and Table 2.

TABLE 2

| | COMPOSITION | x | y | $I_A/I_B$ | $I_1/I_2$ | η | r | Li ION CONDUCTIVE DEGREE (S/cm) |
|---|---|---|---|---|---|---|---|---|
| REFERENCE EXAMPLE 2 | $Li_{3.4}Si_{0.4}P_{0.6}S_4$ | 0.6 | 0 | — | — | 8 | 3.4 | $2.0 \times 10^{-3}$ |
| REFERENCE EXAMPLE 1 | $0.11LiCl \cdot Li_{3.4}Si_{0.4}P_{0.6}S_4$ | 0.6 | 10 | — | — | 8.11 | 3.51 | $3.2 \times 10^{-3}$ |
| EXAMPLE 5 | $0.25LiCl \cdot Li_{3.4}Si_{0.4}P_{0.6}S_4$ | 0.6 | 20 | 1.28 | 2 | 8.25 | 3.65 | $3.18 \times 10^{-3}$ |
| EXAMPLE 4 | $0.43LiCl \cdot Li_{3.4}Si_{0.4}P_{0.6}S_4$ | 0.6 | 30 | 1.11 | 1.43 | 8.43 | 3.83 | $4.53 \times 10^{-3}$ |
| EXAMPLE 3 | $0.67LiCl \cdot Li_{3.4}Si_{0.4}P_{0.6}S_4$ | 0.6 | 40 | 0 | 2.02 | 8.67 | 4.07 | $2.26 \times 10^{-3}$ |
| EXAMPLE 2 | $1LiCl \cdot Li_{3.4}Si_{0.4}P_{0.6}S_4$ | 0.6 | 50 | 0 | 2.32 | 9 | 4.4 | $2.23 \times 10^{-3}$ |
| EXAMPLE 1 | $1.5LiCl \cdot Li_{3.4}Si_{0.4}P_{0.6}S_4$ | 0.6 | 60 | 0 | 2.78 | 9.5 | 4.9 | $1.87 \times 10^{-3}$ |

As shown in FIG. 6 to FIG. 9 and Table 2, it was confirmed that Examples 1 to 5 exhibited Li ion conductive degrees higher than or equal to that of Reference Example 2. Particularly, in Example 4, it was confirmed that the Li ion conductive degree was markedly increased. This is speculated to be due to the synergistic effect given by the presence of the crystal phase A and the crystal phase B. Furthermore, when the values of η and γ were in predetermined ranges, satisfactory Li ion conductive degree was obtained.

REFERENCE SIGNS LIST 1 cathode active material layer
2 anode active material layer
3 electrolyte layer
4 cathode current collector
5 anode current collector
6 battery case
10 battery

What is claimed is:

1. A sulfide solid electrolyte material, comprising a Li element, a Si element, a P element, a S element, and an X element (in which X represents at least one of F, Cl, Br and I),
    wherein the sulfide solid electrolyte material has a crystal phase B that has peaks at positions of 2θ=15.60° ±1.00°, 18.04° ±1.00°, 25.60° ±1.00°, 30.12°±1.00°, and 31.46° ±1.00°, and that does not have a peak at a position of 27.33° ±1.00°, measured by X-ray diffractometry using CuKα ray,
    wherein when the diffraction intensity of the peak of 2θ=30.12° ±1.00° is designated as $I_1$, and the diffraction intensity of the peak of 2θ=31.46° ±1.00° is designated as $I_2$, a value of a ratio $I_1/I_2$ is in a range of 1.4 to 2.8, and
    wherein the sulfide solid electrolyte material has a composition of $y(LiX) \cdot (100-y)(Li_{(4-x)}Si_{(1-x)}P_xS_4)$, in which x satisfies the relationship: 0.55≤x≤0.7, and y satisfies the relationship: 20≤y ≤60.

2. The sulfide solid electrolyte material according to claim 1, wherein the sulfide solid electrolyte material has a crystal phase A having a peak at a position of 2θ=29.58°±1.00° measured by X-ray diffractometry using CuKα ray.

3. The sulfide solid electrolyte material according to claim 2, wherein when a diffraction intensity of the peak at 2θ=29.58° ±1.00° is designated as $I_A$, and a diffraction intensity of the peak at 2θ=30.12° ±1.00° is designated as $I_B$, a value of a ratio $I_A/I_B$ is 1.3 or less.

4. The sulfide solid electrolyte material according to claim 1, wherein x satisfies the relationship: x =0.6.

5. The sulfide solid electrolyte material according to claim 1, wherein η represented by the following formula satisfies the relationship: 8.2≤η≤9.5:

$$\eta = \Sigma_{I=1}^{N} v_I m_I / \Sigma m_\alpha,$$

in which $v_I$ represents a valence of cationic elements comprising the Li element, the Si element, and the P element; $m_I$ represents a number of moles of the cationic element; N represents a total number of cation species included in the sulfide solid electrolyte material; and $m_\alpha$ represents a number of moles of cationic elements excluding the Li element.

6. The sulfide solid electrolyte material according to claim 1, wherein γ represented by the following formula satisfies the relationship: 3.6≤γ≤4.9:

$$\gamma = m_{Li} / \Sigma m_\alpha,$$

in which $m_{Li}$ represents a number of moles of the Li element; and $m_\alpha$ represents a number of moles of cationic elements comprising the Si element and the P element, and excluding the Li element.

7. The sulfide solid electrolyte material according to claim 1, wherein X represents Cl.

8. A battery comprising a cathode active material layer containing a cathode active material; an anode active material layer containing an anode active material; and an electrolyte layer formed between the cathode active material layer and the anode active material layer,
    wherein at least one of the cathode active material layer, the anode active material layer and the electrolyte layer contains the sulfide solid electrolyte material according to claim 1.

9. A method for producing the sulfide solid electrolyte material according to claim 1,
    comprising steps of:
    an ion conductive material synthesis step of synthesizing an amorphized ion conductive material by mechanical milling using a raw material composition containing a constituent component of the sulfide solid electrolyte material; and
    a heating step of obtaining the sulfide solid electrolyte material by heating the amorphized ion conductive material.

* * * * *